July 23, 1929.  C. A. OLSON  1,721,744

LAWN MOWER

Filed July 2, 1928

Inventor

C. A. Olson

By Earl M. Sinclair

Attorney

Patented July 23, 1929.

1,721,744

UNITED STATES PATENT OFFICE.

CARL A. OLSON, OF CLARINDA, IOWA, ASSIGNOR TO CLARINDA MANUFACTURING COMPANY, OF CLARINDA, IOWA, A CORPORATION OF IOWA.

LAWN MOWER.

Application filed July 2, 1928. Serial No. 289,857.

The object of my present invention is to provide improved adjusting means for the bed bar and stationary knife of a lawn mower, such adjusting means constituting a single screw at each end of the bed bar, whereby the adjusting operation is facilitated.

Still another object is to provide an improved single screw adjusting means which is simple and easily operated.

Still another object is to provide improved means for mounting the bed bar of a lawn mower, whereby said bed bar may be easily and quickly adjusted and may also be readily dismounted at times.

With these and other objects in view, my invention consists in the construction, arrangement and combination of elements hereinafter set forth, pointed out in the claims and indicated by the accompanying drawing in which—

Figure 1:
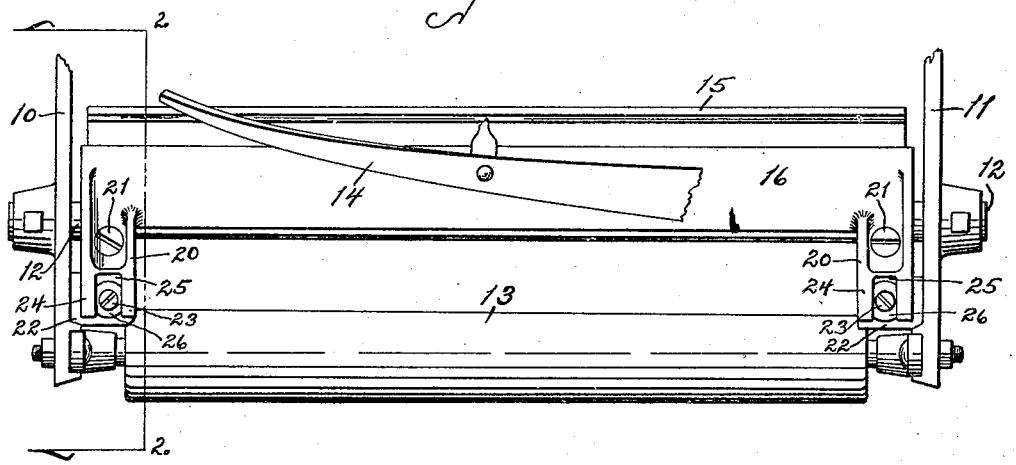
Fig. 1 is a plan view showing a portion of a lawn mower constructed in accordance with my improvement.
Figure 2:
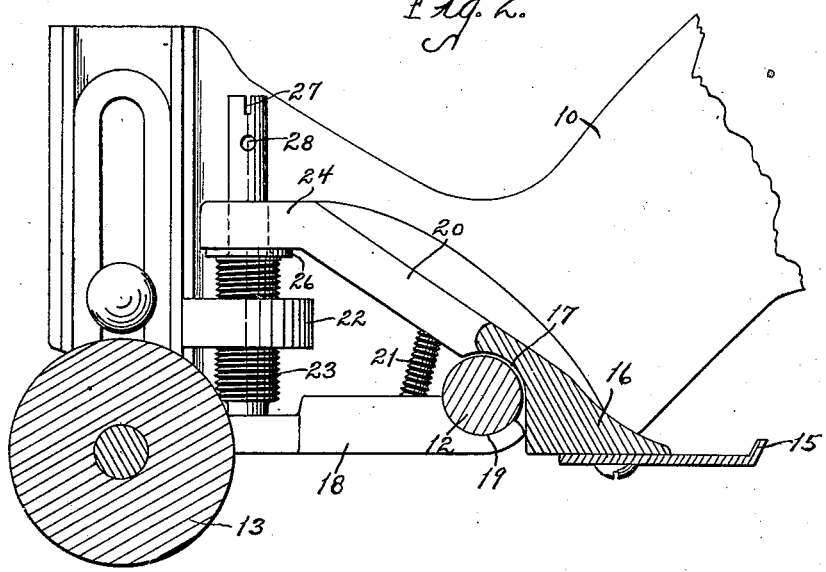
Fig. 2 is a cross-section on an enlarged scale on the line 2—2 of Fig. 1.

The lawn mower as shown in the accompanying drawing includes spaced side frames, which I have designated by the numerals 10 and 11, said side frames being connected by a tie rod 12 and also carrying a roller 13 at their rear ends. The mower includes a rotary cutter, a portion of which is shown in Fig. 1 and designated by the numeral 14, which cutter is revolved by gearing from the traction wheels as the mower is advanced. The rotary cutter 14 cooperates with a relatively stationary blade 15, which is carried by a bed bar 16 extending transversely between the side frames.

According to my present improvement, the bed bar 16 is formed on its lower face with a concaved seat 17 to receive the tie rod 12. A clamping member 18 is arranged near each end of the bed bar 16 and extends rearwardly therefrom, each of said clamping members being formed near its forward end with a concaved seat 19 to embrace the lower side of the tie rod 12. At each end the bed bar 16 is formed with an upwardly and rearwardly inclined arm, said arms being designated by the numeral 20 and said arms overlie the respective clamping members 18. Just rearwardly of the tie rod 12 the arms 20 are provided with clamping bolts 21, which extend through said arms and through the clamping members 18 and serve to mount the bed bar and clamping members relative to said tie rod.

Each side frame 10 and 11 is formed with an ear 22, which extends inwardly between the adjacent clamping member 18 and arm 20 of the bed bar and each of said ears is formed with a vertically tapped hole to receive an adjusting screw 23.

Each arm 20 has a substantially horizontal portion 24 at its upper rear end formed with a slot or bifurcation 25 through which one of the adjusting screws 23 extends loosely. The adjusting screws 23 are shouldered and a washer 26 is mounted thereon and engages the lower face of the slotted portion 24 of one of the arms 20. The lower end of each adjusting screw 23 engages the rear end of one of the clamping members 18.

In practical use, the adjusting screws 23 are rotated in any suitable manner as by a screw driver engaging a kerf 27 in the upper end or by means of a nail inserted through a hole 28. As the adjusting screws at opposite sides of the machine are adjusted, the bed bar 16 swings on the axis of the tie rod 12 and the blade 15 is adjusted relative to the rotary cutter 14 in the desired manner. During this operation the point of the adjusting screws 23 slip on the clamping members 18 and the washers 26 slide on the lower faces of the slotted portions 24 of the arms. The tension on the adjusting screws 23 through the clamping members 18, which are rigidly held to the tie rod and bed bar, serves to lock the screws in adjusted positions. At the same time, the screws are easy and convenient to turn and the adjusting operation is greatly facilitated by the provision whereby the adjustment is secured through the manipulation of one screw at each end of the bed bar.

This method of mounting the bed bar through the use of the clamping members also facilitates the operation of asembling the machine and permits the bed bar to be easily dismounted should occasion require it. This method of mounting the bed bar also provides a strong construction for the frame.

I claim as my invention:

1. In a lawn mower, spaced side frames, a tie rod connecting said frames, a bed bar, a knife carried by said bed bar, clamping members engaging said tie rod, means connected with said clamping members for drawing said bed bar toward said tie rod, apertured ears carried by said side frames and projecting above said clamping members, arms formed on said bed bar and having slotted portions extending above said ears, and adjusting screws threaded in said ears and extending into engagement with said clamping members, said adjusting screws being shouldered for engagement with the lower surfaces of the slotted portions of said arms.

2. In a lawn mower having spaced side frames and a tie member connecting said side frames, together with a knife-carrying bed bar mounted between said frames and extending across said tie member, an adjusting means including a screw carried by each of said side frames, a bifurcated arm at each end of the bed bar, the bifurcation of each arm receiving the upper end portion of one of the adjusting screws, a washer on each of said screws having a contact with the lower surface of the slotted portion of one of said arms, a clamping member engaged by the lower end of each of said screws and extending into engagement with said tie member, and clamping bolts engaging the clamping members and the arms on said bed bar and drawing them together and toward said tie member.

3. In a lawn mower, spaced side frames, a tie member connecting said side frames, an apertured ear projecting inwardly from each of said side frames at the rear of said tie member, a knife-carrying bed bar mounted between said side frames and having an arm at each end projecting across said tie member, said arms being longitudinally slotted above one of said ears, a clamping member near each of said side frames extending beneath said tie member and beneath the adjacent ear, a clamping screw connecting each clamping member to the adjacent arm of said bed bar rearwardly of said tie member, and an adjusting screw threaded through each of said ears and having its point in engagement with the underlying clamping member, said adjusting screws having portions engaging the lower surfaces of the overlying arms of the bed bar and also having portions extending loosely through the slots thereof.

CARL A. OLSON.